United States Patent
Asada et al.

(10) Patent No.: US 6,263,862 B1
(45) Date of Patent: *Jul. 24, 2001

(54) COMMON RAIL AND METHOD OF MANUFACTURING THE SAME

(75) Inventors: Kikuo Asada, Mishima; Masayoshi Usui, Numazu; Eiji Watanabe, Shizuoka Prefecture; Kazunori Takikawa; Ryuichi Kusanagi, both of Numazu, all of (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/114,598

(22) Filed: Jul. 13, 1998

(30) Foreign Application Priority Data

Mar. 2, 1998 (JP) .................................................. 10-066251
Mar. 2, 1998 (JP) .................................................. 10-066252

(51) Int. Cl.$^7$ ...................................................... F02M 37/04
(52) U.S. Cl. ............................................ 123/456; 123/468
(58) Field of Search ...................................... 123/468, 469, 123/470, 472, 456, 467

(56) References Cited

U.S. PATENT DOCUMENTS

| 315,074 | 4/1885 | Root . |
| 1,246,456 | 11/1917 | Parpert . |

(List continued on next page.)

FOREIGN PATENT DOCUMENTS

| 806413 | 12/1936 | (FR) . |
| 659623 | 10/1951 | (GB) . |

(List continued on next page.)

*Primary Examiner*—Carl S. Miller
(74) *Attorney, Agent, or Firm*—Anthony J. Casella; Gerald E. Hespos; Michael J. Porco (57) ABSTRACT

There is provided a common rail which can effectively restrict a generation of a tensile stress in a lower end inner peripheral edge portion of a branch hole by canceling by means of a compression residual stress and can improve an internal pressure fatigue strength in a branch pipe connecting portion, so that a secure and stable function can be obtained by having an excellent durability and preventing a fluid leakage due to a generation of the crack generation and a method of manufacturing a common rail in which a pressure application process is only added to a normal manufacturing process, no complex equipment is required, and a common rail having a high quality can be manufactured by a low cost without generating problems that an equipment cost is increased by an increase of the process and a productivity is reduced. In a method of manufacturing a common rail structured such that a branch hole communicating with an communication passage of a block rail and having a pressure receiving seat surface open to an outer portion is provided in at least one connecting hole portion provided in a peripheral wall portion in an axial direction of the block rail having the communication passage in a longitudinal inner portion, a pressing seat surface constituted by a connecting head portion provided in an end portion of a branch having a flow passage communicating with the communication passage is brought into contact with and engaged with the pressure receiving seat surface, and the connecting hole portion and a fastening nut previously assembled in the branch pipe are meshed with each other so as to fasten and connect together with pressing under a neck of the connecting head portion, a pressing force is applied to an axial direction of the connecting hole portion from an outer portion by a press method so as to generate a compression residual stress in the periphery of an open end portion of the communication passage of the block rail of the branch hole.

5 Claims, 10 Drawing Sheets

U.S. PATENT DOCUMENTS

| | | |
|---|---|---|
| 1,264,854 | 4/1918 | Possons . |
| 1,336,423 | 4/1920 | Chadwick . |
| 1,476,756 | 12/1923 | Junkers . |
| 1,519,010 | 12/1924 | Reznor . |
| 1,545,493 | 7/1925 | Hoffman . |
| 1,841,879 | 1/1932 | Croxford . |
| 2,041,209 | 5/1936 | Ridley . |
| 2,426,106 | 8/1947 | Kinley . |
| 2,859,870 | 11/1958 | Hitz . |
| 3,068,029 | 12/1962 | Schwartz . |
| 3,082,850 | 3/1963 | Weening . |
| 3,094,137 | 6/1963 | Burke . |
| 3,259,003 | 7/1966 | Griffin . |
| 3,277,683 | 10/1966 | Knoblock . |
| 4,129,028 | 12/1978 | Leftheris et al. . |
| 4,364,406 | 12/1982 | Bohlin . |
| 4,399,829 | 8/1983 | Schuler . |
| 4,680,845 | 7/1987 | Miller . |
| 4,741,081 | 5/1988 | Redman . |
| 4,832,376 | 5/1989 | Sugao . |
| 4,893,601 | 1/1990 | Sugao . |
| 4,900,180 | 2/1990 | Takikawa . |
| 4,953,896 | 9/1990 | Usui . |
| 4,979,295 | 12/1990 | Stagni et al. . |
| 5,072,710 | 12/1991 | Washizu . |
| 5,120,084 | 6/1992 | Hashimoto . |
| 5,136,999 | 8/1992 | Bassler et al. . |
| 5,143,410 | 9/1992 | Takikawa . |
| 5,169,182 | 12/1992 | Hashimoto . |
| 5,172,939 | 12/1992 | Hashimoto . |
| 5,192,026 | 3/1993 | Rix et al. . |
| 5,265,456 | 11/1993 | Kennedy et al. . |
| 5,667,255 | 9/1997 | Kato . |
| 5,887,910 | 3/1999 | Usui . |
| 5,957,507 | 9/1999 | Asada . |

FOREIGN PATENT DOCUMENTS

| | | |
|---|---|---|
| 836524 | 6/1960 | (GB) . |
| 506067 | 1/1957 | (IT) . |
| 2-80289 | 6/1990 | (JP) . |
| 3-177693 | 8/1991 | (JP) . |
| 4-175462 | 6/1992 | (JP) . |
| 88663 | 7/1958 | (NL) . |

COMMON RAIL AND METHOD OF MANUFACTURING THE SAME

BACKGROUND OF THE INVENTION

1. Field of the Invention

The present invention generally relates to a common rail comprising a block rail in an accumulator fuel injecting system of a diesel internal combustion engine.

2. Description of the Prior Arts

Figure 12:
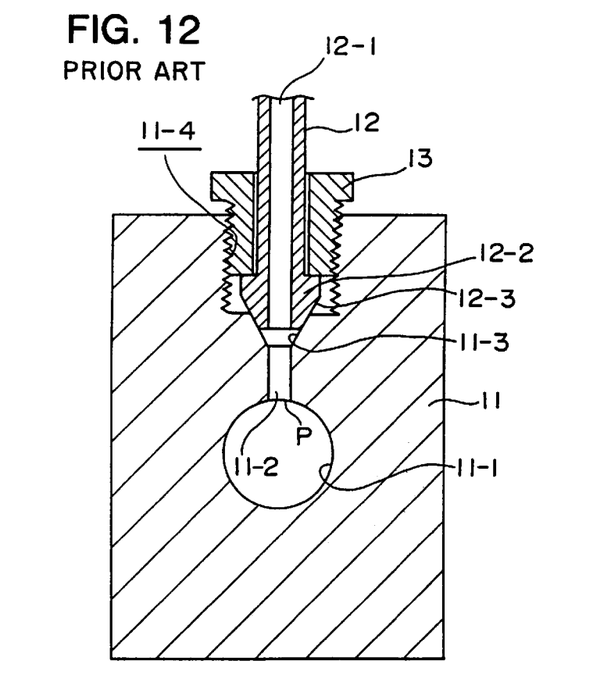
FIG. 12 is a vertical cross sectional view which shows an embodiment of a branch pipe connecting structure of the conventional common rail which is a subject of the invention.

Conventionally, as a common rail of this kind, for example, as shown in FIG. 12, there has been known a common rail of the type which is structured such that a branch hole 11-2 communicating with an communication passage 11-1 of a block rail 11 and having a pressure receiving seat surface 11-3 open to an outer portion is punched in a bottom portion 12-2 of a plurality of connecting hole portions 11-4 provided in a peripheral wall portion of the block rail 11 having a rectangular cross section in an axial direction at an interval, a pressing seat surface 12-3 constituted by a connecting head portion 12-2 of a branch pipe 12 end is brought into contact with and engaged with the pressure receiving seat surface 11-3 of the block rail 11 end, and a fastening external screw nut 13 previously assembled in the branch pipe end is meshed with the connecting hole portion 11-4, thereby fastening and connecting together with pressing under a neck of the connecting head portion 12-2. In the drawing, reference numeral 12-1 denotes a flow passage of the branch pipe 12. In this case, the cross sectional shape of the block rail is not limited to a rectangular shape, and various kinds of shapes such as a triangular shape and a trapezoidal shape can be employed.

However, in the case of the conventional common rail structured such that the branch hole 11-2 is provided in the connecting hole portion 11-4 disposed in the block rail 11, a great tensional force is generated in an inner peripheral edge portion P of a lower end of the branch hole 11-2 due to a repeating high internal pressure within the block rail 11 and an axial force applied to the pressure receiving seat surface 11-3 together with a pressing of the connecting head portion 12-2 in the branch pipe 12, so that a crack is easily generated from the inner peripheral edge portion P of the lower end and there is a possibility of causing a leak.

SUMMARY OF THE INVENTION

The present invention is made so as to solve the conventional problems mentioned above, and an object of the invention is to provide a common rail which can reduce a maximum tensile stress value generated in an inner peripheral edge portion of a lower end of a branch hole and can improve an internal pressure fatigue strength.

In order to achieve the object mentioned above, in accordance with the invention, there is provided a common rail structured such that a branch hole communicating with an communication passage of a block rail and having a pressure receiving seat surface open to an outer portion is provided in at least one connecting hole portion provided in a peripheral wall portion in an axial direction of the block rail having the communication passage in a longitudinal inner portion, a pressing seat surface constituted by a connecting head portion provided in an end portion of a branch having a flow passage communicating with the communication passage is brought into contact with and engaged with the pressure receiving seat surface, and the connecting hole portion and a fastening nut previously assembled in the branch pipe are meshed with each other so as to fasten and connect together with pressing under a neck of the connecting head portion, wherein a compression residual stress exists in a periphery of an end portion of the communication passage of the block rail of the branch hole.

Further, in a method of manufacturing a common rail in accordance with the invention which is structured such that a branch hole communicating with an communication passage of a block rail and having a pressure receiving seat surface open to an outer portion is provided in at least one connecting hole portion provided in a peripheral wall portion in an axial direction of the block rail having the communication passage in a longitudinal inner portion, a pressing seat surface constituted by a connecting head portion provided in an end portion of a branch having a flow passage communicating with the communication passage is brought into contact with and engaged with the pressure receiving seat surface, and the connecting hole portion and a fastening nut previously assembled in the branch pipe are meshed with each other so as to fasten and connect together with pressing under a neck of the connecting head portion, a first aspect of the invention is characterized in that a pressing force is applied to an axial direction of the connecting hole portion from an outer portion preferably by a press method so as to generate a compression residual stress in the periphery of an open end portion of the communication passage of the block rail of the branch hole, and a second aspect of the invention is characterized in that the branch hole is punched at the same time of applying the pressing force to the axial direction of the connecting hole portion from the outer portion by an external pressing method. Next, a third aspect of the invention is characterized in that the pressing force is applied to an inner peripheral surface of the block rail at a portion near the branch hole by an internal pressure method so as to generate a compression residual stress at a portion near the open end portion of the communication passage of the block rail of the branch hole, a fourth aspect of the invention is characterized in that the pressing force is applied to the inner peripheral surface of the block rail at a portion near the branch hole by a pipe expansion method structured such as to apply a pressure to an diametrical direction from the inner portion of the block rail so as to generate a compression residual stress at a portion near the open end portion of the communication passage of the block rail of the branch hole, and a fifth aspect of the invention is characterized in that the pressing force is applied to the inner peripheral surface of the branch hole by a pipe expansion method structured such as to apply a pressure to an diametrical direction from the inner portion of the branch hole so as to generate a compression residual stress at a portion near the open end portion of the communication passage of the block rail of the branch hole.

Further, in accordance with a sixth aspect of the invention, there is provided a method of manufacturing a common rail structured such that a branch hole communicating with an communication passage of a block rail and having a pressure receiving seat surface open to an outer portion is provided in at least one connecting hole portion provided in a peripheral wall portion in an axial direction of the block rail having the communication passage in a longitudinal inner portion, a pressing seat surface constituted by a connecting head portion provided in an end portion of a branch having a flow passage communicating with the communication passage is brought into contact with and engaged, and a nut previously assembled in the branch pipe is meshed so as to fasten and connect together with pressing under a neck of the connecting head portion, wherein a piece-like body formed in a spherical body or having a narrowed tip end is pressed to the open end portion of the communication passage of the block rail at a portion near the branch hole so as to generate a compression residual stress in a periphery of the open end portion of the communication passage of the block rail of the branch hole.

Accordingly, in accordance with the invention, by remaining a compression residual stress at a portion near the open end portion of the communication passage of the block rail in the branch hole, a tensile stress generated in an inner peripheral edge portion P of the lower end of the branch hole by a repeated high internal pressure within the block rail and an axial force applied to the pressure receiving seat surface together with a pressing by the connection head portion of the branch pipe is canceled by the compression residual stress, thereby reducing a maximum tensile stress value generated in the inner peripheral edge portion of the lower end of the branch hole. As a method of generating and remaining a compression residual stress at a portion near the open end portion of the communication passage of the block rail in the branch hole, the following methods are used, a method of applying a pressing force to the connecting hole portion from an outer portion in an axial direction by a press method, a method of applying a pressure within the communication passage of the block rail, a pipe expansion method of mechanically applying a pressing force from the inner portion of the block rail in a diametrical direction, a diameter expansion method of mechanically applying a pressing force from the inner portion of the branch hole in a diametrical direction of the branch hole, or a method of pressing a piece-like body formed in a spherical body or having a tapered front end.

In this case, as the method of applying a pressing force to the connecting hole portion in the axial direction from the outer portion by a press method, for example, a method of pressing by using a punch or a rod in a state of mounting the rail body on a mold or of piercing the branch hole at the same time of pressing can be used. Further, as the method of applying a pressure within the communication passage of the block rail, a hydraulic pressure such as an oil pressure or a water pressure can be employed. Still further, as the pipe expansion method of mechanically applying a pressing force from the inner portion of the rail to the diametrical direction, for example, a method of pressure fitting by a drawing-out method or a pressing method by means of a diameter expansion device such as a spherical body or a shell-like plug having a diameter slightly larger than an inner diameter of the communication passage within the communication passage of the block rail, or a diameter expansion method by a vanishing tool can be used. Furthermore, as the diameter expansion method of mechanically applying a pressing force from the inner portion of the branch hole to a diametrical direction of the branch hole, a method of pressure fitting a spherical body or a plug having a diameter substantially the same diameter as a predetermined inner diameter of the branch hole into the branch hole of the small diameter by a pressing method with piercing the branch hole in such a manner as to have a diameter slightly smaller than a predetermined hole diameter can be used. Moreover, as the method of pressure fitting a piece-like body formed in a spherical body or having a tapered front end, a method of pressing the punch and the piece-like body so as to mutually close to each other and pressing the spherical body or the piece-like body to the inner peripheral edge portion of the lower end of the branch hole can be used.

As mentioned above, in accordance with the invention, by remaining a compression residual stress at the portion near the open end portion of the communication passage of the block rail in the branch hole, the tensile stress generated in the inner peripheral edge portion P of the lower end of the branch hole at a time of a high pressure fuel accumulation to the communication passage in a use time can be canceled by a compression residual stress so as to be effectively restricted, thereby improving an internal pressure fatigue strength in the branch pipe connecting portion.

BRIEF DESCRIPTION OF THE DRAWINGS

FIGS. 2A, 2B, 2C, 2D and 2E are views showing pressing force application means in the manufacturing method of the first embodiment, in which

FIGS. 9A and 9B are schematic views which show a fifth embodiment of a method of manufacturing a common rail in accordance with the invention, in which

FIGS. 10A, 10B, 10C and 10D are schematic views which show a sixth embodiment of a method of manufacturing a common rail in accordance with the invention, in which

DETAILED DESCRIPTION OF THE PREFERRED EMBODIMENTS

In the invention, reference numeral 1 denotes a block rail, reference numeral 2 denotes a branch pipe, reference numeral 3 denotes a external screw nut for fastening, reference numeral 4 denotes a punch, reference numeral 5 denotes a mold, reference numerals 6-1 and 6-2 denote a diameter expanding device, reference numeral 7 denotes a fixing jig, reference numeral 8 denotes a tension apparatus, and reference numeral 9 denotes a pressing apparatus. In this case, an explanation will be given with exemplifying a common rail having a rectangular cross section.

The block rail 1 as a common rail is a forging product made of S45C having, for example, rectangular cross section comprising 80 mm in a vertical direction, 50 mm in a horizontal direction and an inner diameter of 10 mm and an inner portion in a longitudinal direction of a member having the rectangular cross section is formed as a communication passage 1-1 by a machining such as a boring gun drill, so that at least one connecting hole portion 1-4 is provided on a peripheral wall portion in an axial direction.

In the case of the common rail, at first in a pre-working process (a cutting process), a hole with a bottom 1-5 having a predetermined diameter and a predetermined depth is cut and formed on a peripheral wall portion of the block rail 1 by, for example, an end mill.

Figure 1:
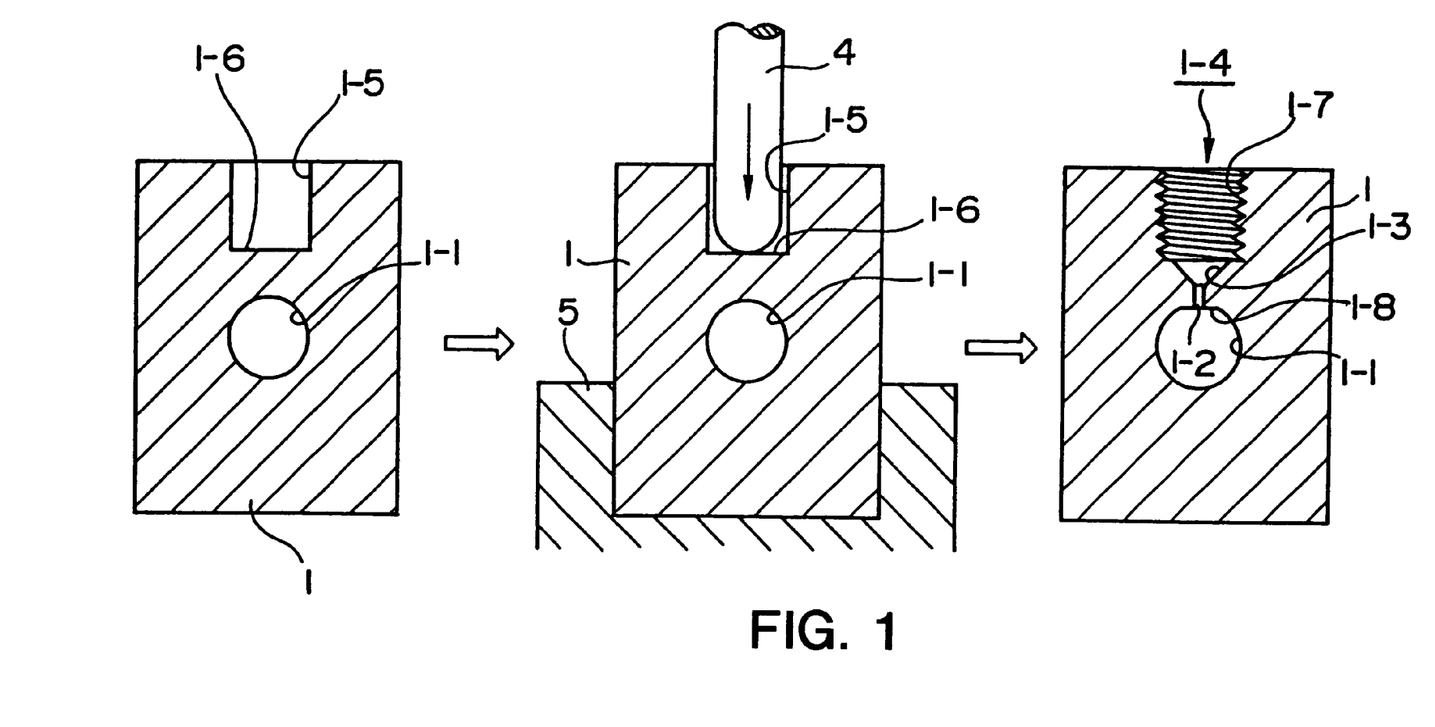
FIG. 1 is a schematic view which shows a first embodiment of a method of manufacturing a common rail having a connecting hole portion integrally formed with a block rail in accordance with the invention.

In a method shown in FIG. 1, following to a pre-working process mentioned above, the portion near the connecting hole portion 1-4 in the block rail 1 is fixed by the mold 5. The mold 5 is constituted by a metal mold having a concave cross section to which the block rail 1 can be fitted, as shown in the drawing, and substantially lower half periphery of the block rail 1 is fixed to the metal mold 5 so as to be held. This is necessary for sufficiently obtaining an effect by the press. When the block rail 1 is fixed to the mold 6, a pressing force is applied to an inner bottom portion 1-6 of the connecting hole portion by the punch 4 mounted to a press apparatus and having a diameter smaller than an inner diameter of a hole 1-5 with a bottom in the connecting hole portion 1-4.

As the pressing force at this time, although it is not specifically limited, it is sufficient to set a degree that the inner peripheral surface of the communication passage of the block rail 1-1 positioned immediately below the inner bottom portion of the connecting hole portion slightly projects so that a flat portion 1-8 is formed. Due to the pressing force by the punch 4, as well as the inner peripheral surface of the communication passage of the block rail 1-1 slightly projects so as to form the flat portion, a plastically deformed portion and an elastically deformed portion are produced at a time of applying the pressing force, and a compression residual stress is generated due to a deformation generated by a difference of a return amount at a time of removing the pressing force.

Continuously, in a finish working process, the branch hole 1-2 is formed in the connecting hole portion 1-4 in such a manner as to make the circular and outward open peripheral surface communicating with the communication passage 1-1 of the block rail 1 and communicating with the communication passage a pressure receiving surface 1-3, and further a female screw 1-7 is worked on an inner peripheral surface of the hole 1-5 with a bottom of the connecting hole portion. In this case, the female screw 1-7 may be previously formed in the pre-working process.

Figure 2A:
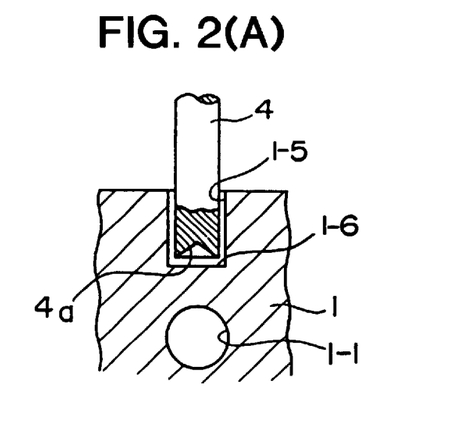
FIG. 2A is a vertical cross sectional view of a connecting hole portion which shows a method of pressing by using a punch having a pressing surface formed in an inverted concave shape in a state of being partially broken.

Next, FIG. 2 exemplifies pressing force application means by a press method for remaining a compression residual stress at a portion near the open end portion of the communication passage of the block rail in the branch hole 1-2, in which FIG. 2A shows a method of forming a concave portion 4a having a triangular cross section in a front end portion (a pressing surface) of the punch 4 and applying a pressing force to the bottom portion 1-6 of the hole 1-5 with a bottom in the connecting hole portion 1-4 by the punch. In the case of this method, since a great pressing force is applied to the inner peripheral wall end in addition to the center portion of the bottom portion, a compression residual stress can be effectively remained in a relatively wide range at a portion near the branch hole 1-2 provided in the portion.

Figure 2B:
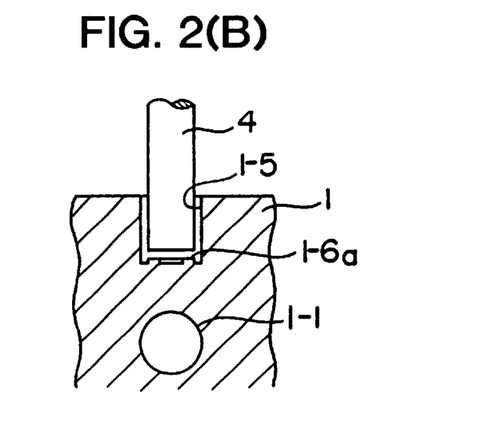
FIG. 2B is a vertical cross sectional view of the connecting hole portion which shows a method of pressing by using a punch having an annular projection provided on an inner bottom portion of the connecting hole portion and a flat pressing surface.

Further, FIG. 2B shows a method of remaining a compression residual stress in a relatively wide range at a portion near the branch hole 1-2 which is later provided in the same manner as that of FIG. 2A by providing an annular projection 1-6a on the inner bottom portion 1-6 in the connecting hole portion 1-4 and pressing an upper surface of the annular projection 1-6a by the punch 4 having a flat pressing surface.

Figure 2C:
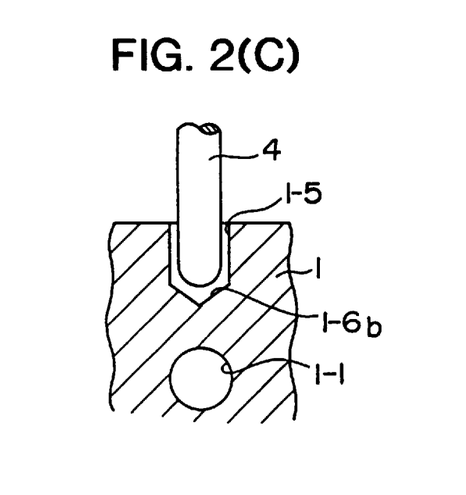
FIG. 2C is a vertical cross sectional view of the connecting hole portion which shows a method of pressing by using a punch having the inner bottom portion of the connecting hole portion formed in a concave shape and a pressing surface formed in a curved surface such as a spherical surface and an oval surface.

FIG. 2C shows a method of forming the inner bottom portion of the connecting hole portion 1-4 in a concave portion 1-6b having an inverted triangular cross sectional shape and pressing a bottom portion constituted by the concave portion 1-6b by the punch 5 having a pressing surface formed in a spherical surface or an oval surface. In this method, since an inclined surface of the bottom portion is first pressed by the punch 4, in this case, a compression residual stress is effectively remained at a portion near the branch hole 1-2 which is later provided.

Figure 2D:
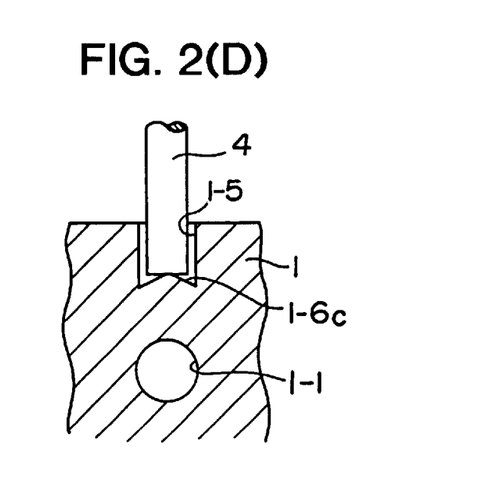
FIG. 2D is a vertical cross sectional view of the connecting hole portion which shows a method of pressing by using a punch having the inner bottom portion of the connecting hole portion projected in an angular shape and a pressing surface formed in a flat shape.

FIG. 2D shows a method of providing a projection 1-6c having an angular cross sectional shape on the inner bottom portion of the connecting hole portion 1-4 and pressing the bottom portion constituted by the projection 1-6c by the punch 4 having a flat pressing surface. In this method, since a top portion of the projection 1-6c having an angular cross section is first pressed by the punch 4, a great pressing force is applied to the center portion of the bottom portion. Accordingly, also in this case, a great compression residual stress is remained at a portion near the branch hole 1-2 which is later provided in a concentrated manner.

Figure 2E:
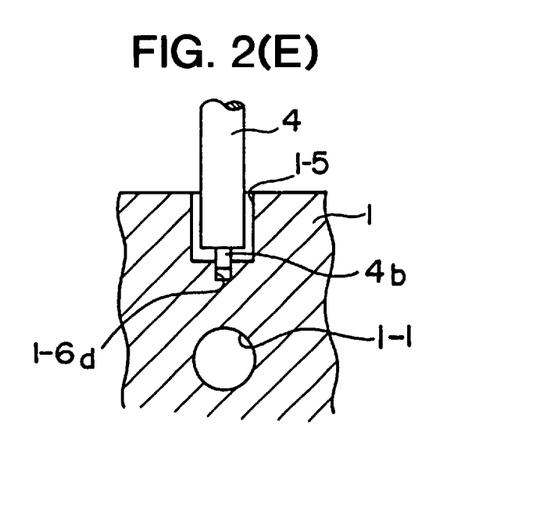
FIG. 2E is a vertical cross sectional view of the connecting hole portion which shows a method of pressing by using a punch having a hole with a bottom having the same diameter as that of the branch hole in a center portion of the inner bottom portion of the connecting hole portion and a projection having a diameter capable of fitting to the hole with the bottom formed on the pressing surface.

FIG. 2E shows a method of providing a hole with a bottom 1-6d having an appropriate depth and substantially the same diameter as that of the branch hole 1-2 later provided in the center of the inner bottom portion of the connecting hole portion 1-4 and pressing the projection 4b having a diameter capable of fitting to the hole with a bottom 1-6d and a length slightly longer than a depth of the hole with a bottom by the punch 4 provided on the pressing surface. In the case of this method, since the peripheral portion of the hole with a bottom 1-6d is pressed at the same time as the hole with a bottom 1-6d is pressed by the projection 4b, the pressing force is applied to the portion of the branch hole 1-2 later provided in a concentrated manner and a compression residual stress is necessarily remained at a portion near the branch hole 1-2. In this case, a shape of the front end of the punch and a shape of the inner bottom portion of the connecting hole portion are not limited to combinations of these shapes.

Figure 3:
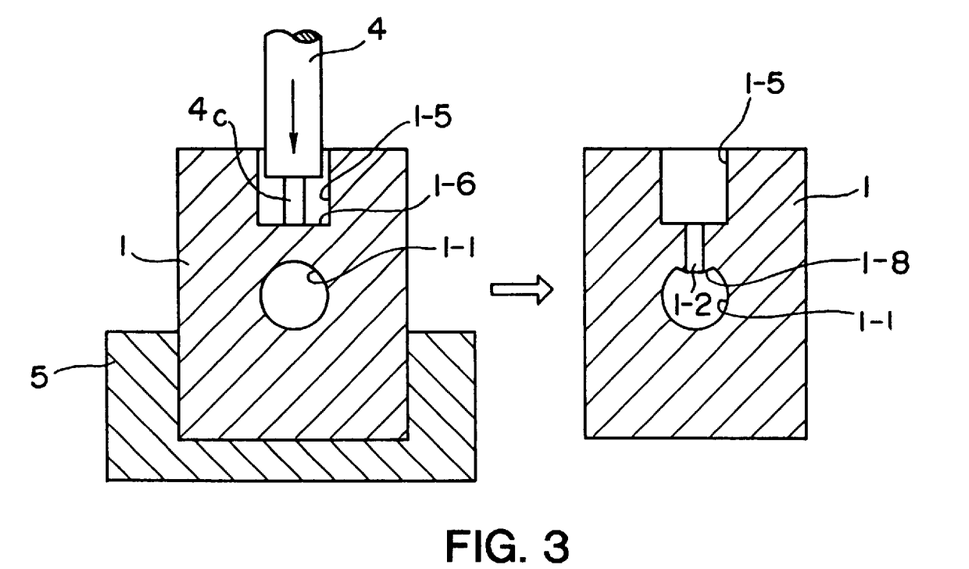
FIG. 3 is a vertical sectional view of the connecting hole portion which shows an embodiment of a method of piercing the branch hole at the same time of applying the pressing force in the manufacturing method in accordance with the first embodiment.

Further, FIG. 3 shows an embodiment of a method of piercing the branch hole at the same time of applying the pressing force in the manufacturing method in accordance with the first embodiment, in which the punch 4 having a diameter capable of fitting into the hole with a bottom 1-5 provided in the connecting hole portion 1-4 and provided with a projection 4c having the same diameter as that of the branch hole 1-2 and a length larger than a remaining thickness of the bottom portion of the hole with a bottom 1-5 in the front end is used, the branch hole 1-2 is punched with pressing the bottom portion of the hole with a bottom 1-5. In this method, since the bottom portion of the hole with a bottom 1-5 is pressed by the projection 4c, the pressing force is applied to the portion of the branch hole 1-2 punched at the same time in a concentrated manner and a compression residual stress is necessarily remained also at a portion near the branch hole 1-2.

As a method of applying a pressing force by a press method in accordance with the invention and generating a residual compression stress, as well as the methods mentioned above, methods as shown in FIGS. 4 and 5 can be employed.

Figure 4:
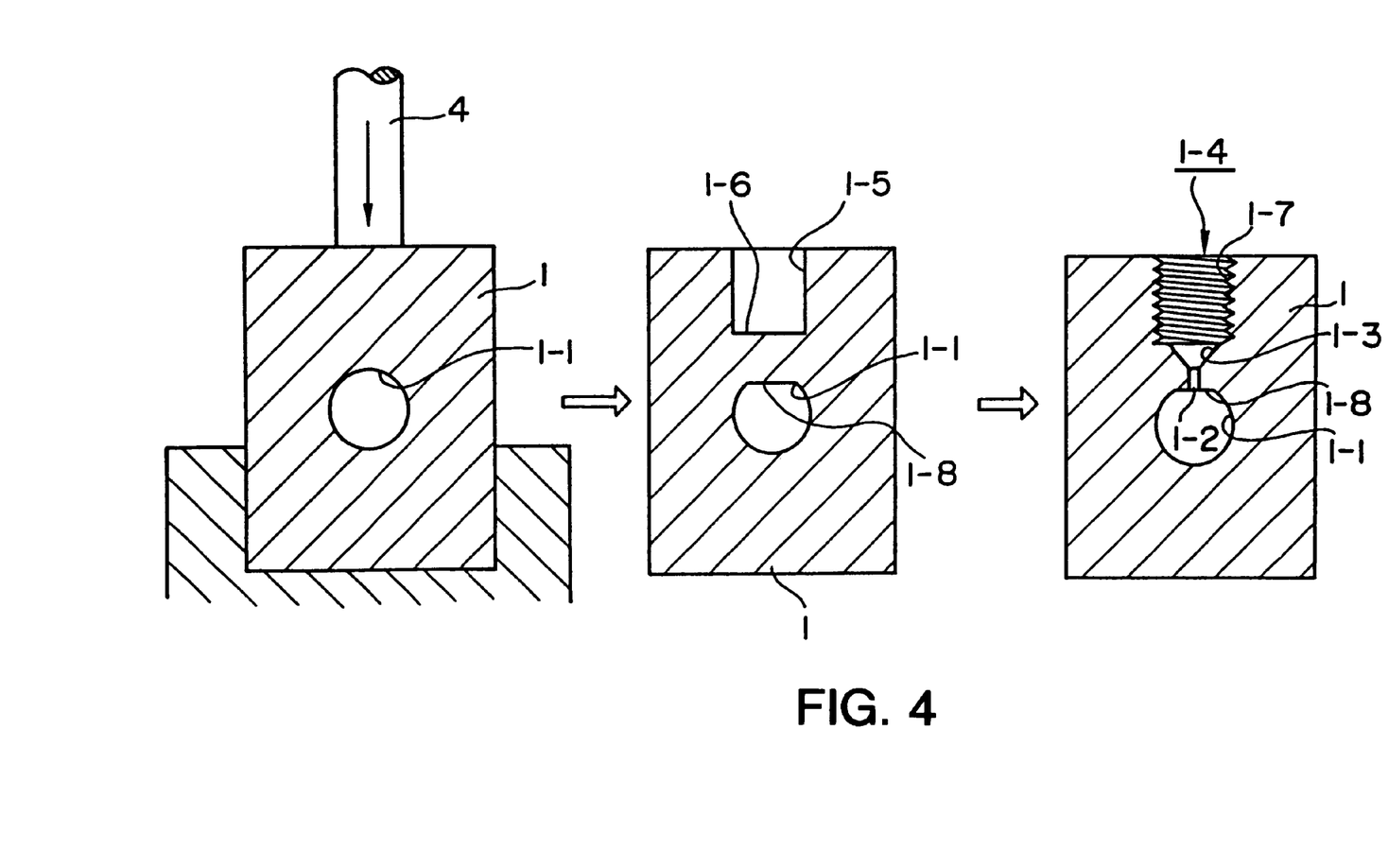
FIG. 4 is a schematic view which shows a modified embodiment of the first embodiment of the method of manufacturing the common rail in accordance with the invention.

At first, in FIG. 4, the block rail 1 on which the communication passage 1-1 is punched is fixed to the mold 5 and the pressing force is applied to a position corresponding to the connecting hole portion by the punch 4 mounted to the press apparatus. Due to this pressing force of the punch, the inner peripheral surface of the communication passage 1-1 of the block rail 1 slightly projects so that a flat portion 1-8 is formed and a compression residual stress is generated and remained. Next, after the hole with a bottom 1-5 having a predetermined diameter and a predetermined depth is cut and formed at a position corresponding to the connecting hole portion of the block rail 1, the branch hole 1-2 is formed in the hole portion with a bottom in such a manner as to make a circular and outward open peripheral surface communicating with the communication passage 1-1 of the block rail 1 and communicating with the communication passage a pressure receiving seat surface 1-3, and the connecting hole portion 1-4 is formed in the inner peripheral surface of the hole with a bottom 1-5 by working the female screw.

Figure 5:
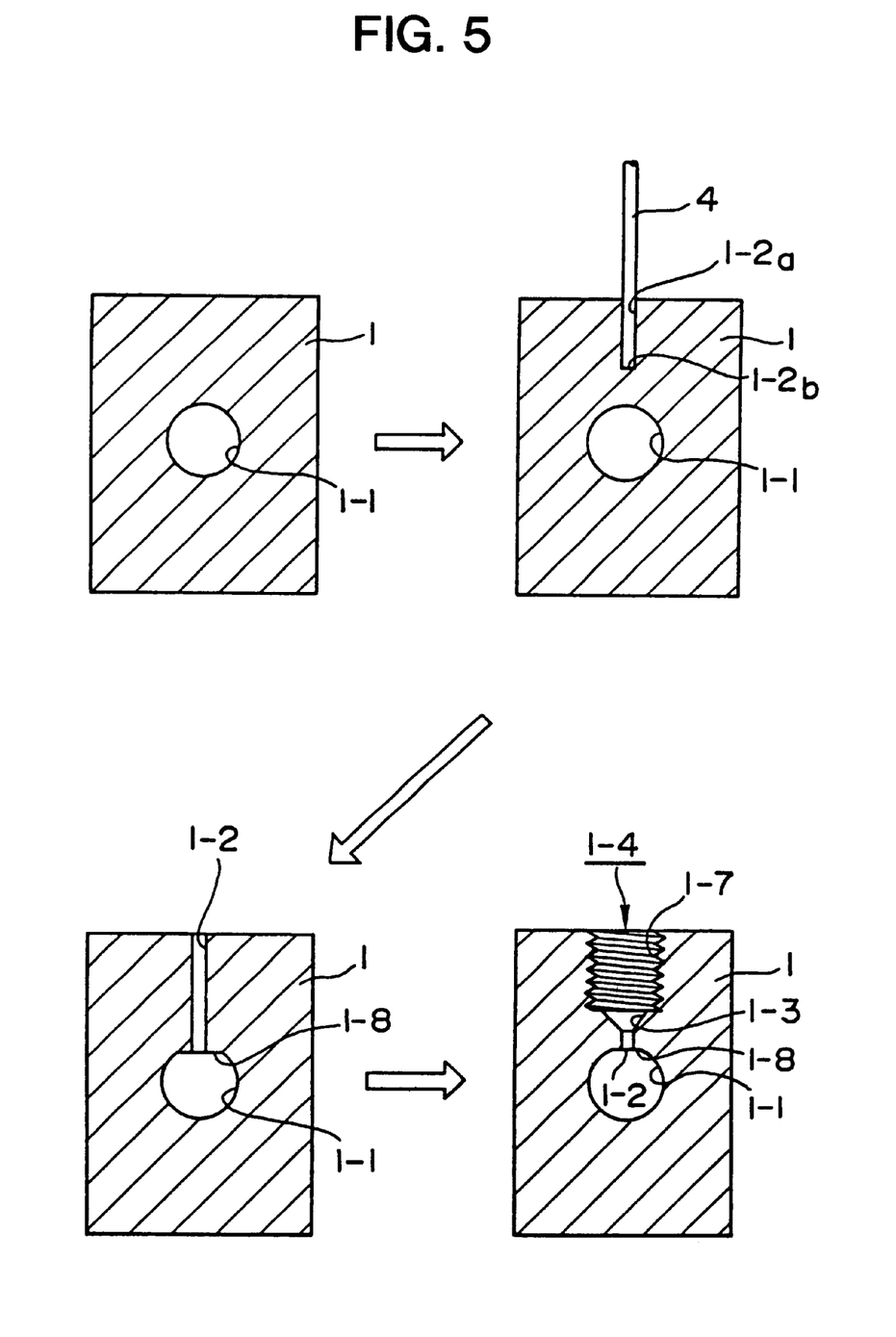
FIG. 5 is a schematic view which shows another modified embodiment of the first embodiment of the method of manufacturing the common rail in accordance with the invention.

Next, in FIG. 5, the hole with a bottom 1-2a having a diameter substantially the same as that of the branch hole 1-2 later provided and having an appropriate depth is provided at a position corresponding to the connecting hole portion, the inner bottom portion 1-2b of the hole with a bottom 1-2a is pressed by the punch 4 having a diameter capable of fitting into the hole with a bottom 1-2a and a length longer than the depth of the hole with a bottom. In this structure, since the inner bottom portion 1-2b is pressed by the punch 4, the pressing force is applied to the portion of the branch hole 1-2 later provided in a concentric manner and a compression residual stress is necessarily remained in the periphery of the branch hole 1-2. In the embodiment of FIG. 5, the hole with a bottom 1-2a is thereafter extended to the communication passage 1-1 by cutting by means of a drill so as to form the branch hole 1-2. Next, after the hole with a bottom 1-5 having a predetermined diameter and a predetermined depth is cut and formed in the branch hole portion, the pressure receiving seat surface 1-3 is formed in the hole with a bottom 1-5 and the female screw 1-7 is worked on the inner periphery of the connecting hole portion so as to form the connecting hole portion 1-4.

Further, as a method of applying the pressing force by a press method by means of a punch and generating a compression residual stress, it is possible to apply the pressing force with slightly shifted from the portion in which the branch hole is formed and concentrate a compression residual stress to at least a part of the branch hole, that is, to an inner peripheral edge portion P in the axial direction of the block rail 1 in the lower end of the branch hole which becomes a starting point of a crack, thereby generating and remaining a compression residual stress.

Figure 6:
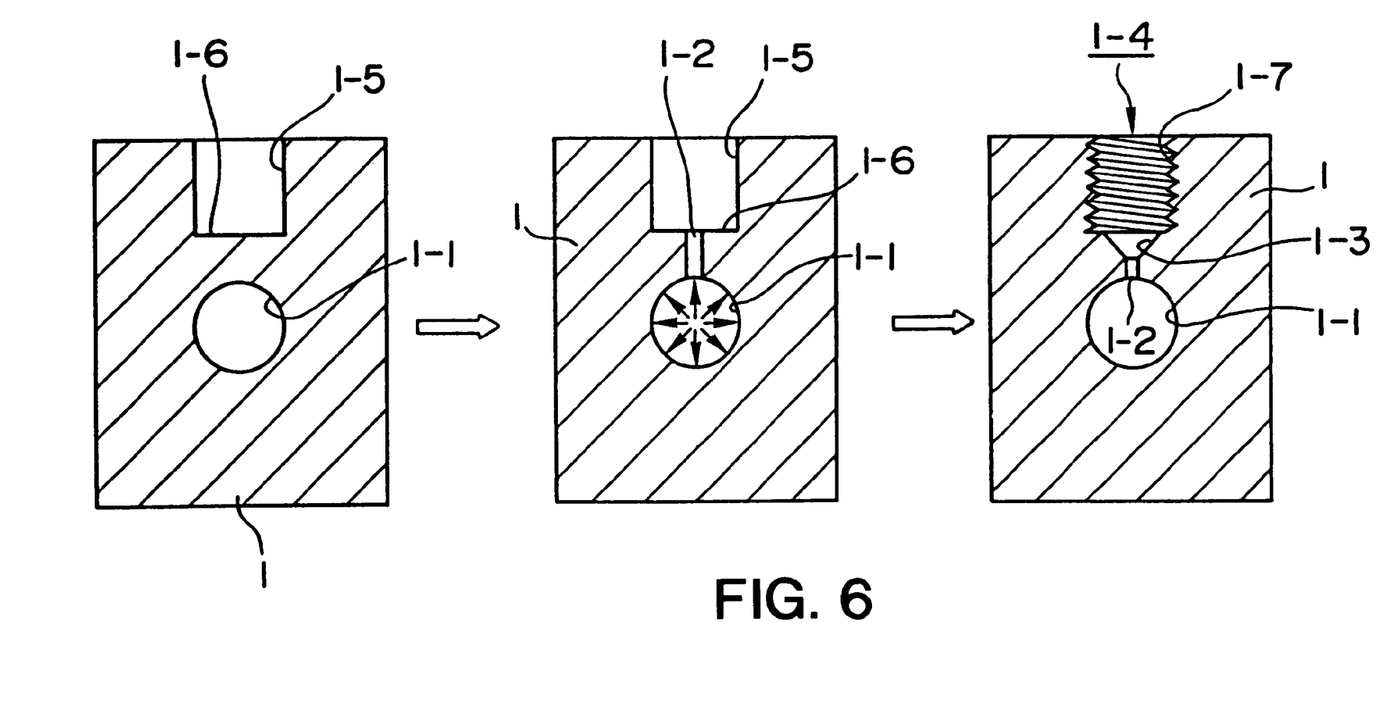
FIG. 6 is a schematic view which shows a second embodiment of a method of manufacturing a common rail having a connecting hole portion integrally formed with the block rail in accordance with the invention.

Next, a method shown in FIG. 6 corresponds to a case that an internal pressure method of applying a pressure within the communication passage 1-1 of the block rail 1 is employed as means for generating a compression residual stress at a portion near the open end portion of the communication passage 1-1 of the block rail 1 in the branch hole 1-2. This method corresponds to a method of generating and remaining a compression residual stress at a portion near the open end portion of the communication passage of the block rail 1 in the branch hole 1-2 by a method of applying a high pressure by which at least 25%, preferably 50 to 75% of a thickness of the block rail 1 is yielded from the inner peripheral surface side of the thickness of the block rail 1 by feeding a liquid fluid such as a water or an oil pressure within the rail in a state of sealing one side of the block rail 1. In this case, a working of the branch hole 1-2 is preferably performed before applying the internal pressure in order that a compression stress is securely remained.

Figure 7:
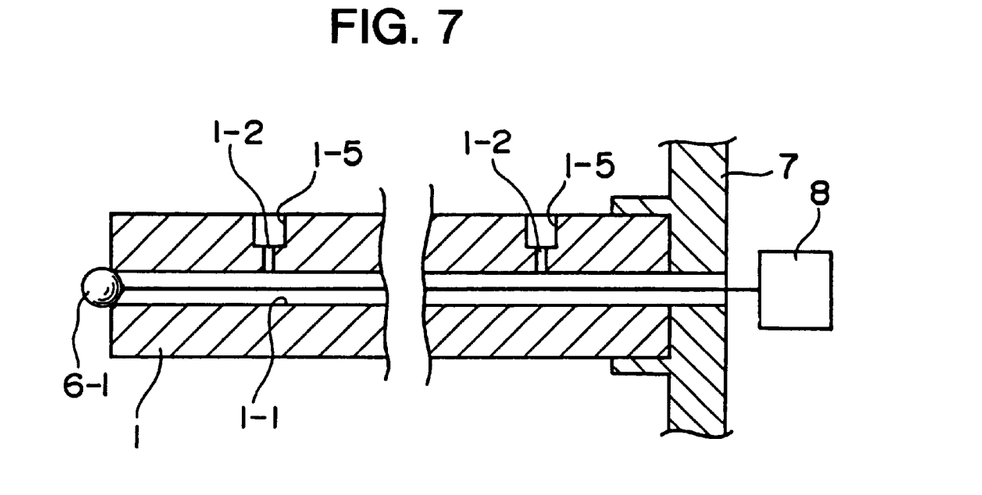
FIG. 7 is a schematic view which shows a third embodiment of a method of manufacturing a common rail in accordance with the invention.

Further, a method shown in FIG. 7 corresponds to a case that a pipe expansion method of mechanically applying a pressing force to a pipe diametrical direction from the inner portion of the block rail 1 is employed as means for generating a compression residual stress at a portion near the open end portion of the communication passage 1-1 of the block rail 1 in the branch hole 1-2. The method corresponds to a method of expanding the inner peripheral surface of the communication passage 1-1 of the block rail 1 by a method of drawing a diameter expansion device 6-1 having a diameter slightly larger than the inner diameter of the rail such as a spherical body, a shell-shaped plug and a roller vanishing tool by a tension apparatus 8 so as to move the inner peripheral surface of the communication passage 1-1 with being in press contact, in a state of horizontally fixing the block rail 1 to a fixing jig 7, and generating and remaining a compression residual stress at a portion near the open end portion of the communication passage 1-1 of the block rail 1 in the branch hole 1-2. In this case, it is preferable to form the branch hole 1-2 before the expanding operation in order that the compression stress is securely remained.

Figure 8:
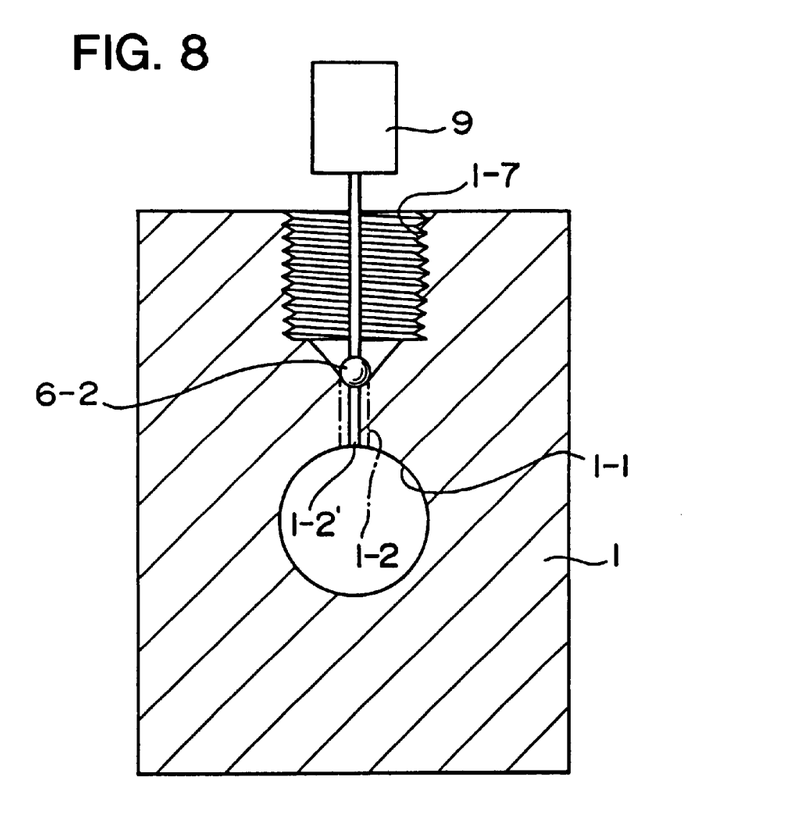
FIG. 8 is a schematic view which shows a fourth embodiment of a method of manufacturing a common rail in accordance with the invention.

Still further, a method shown in FIG. 8 corresponds to a method of punching a branch hole 1-2' having a diameter slightly smaller than a predetermined hole diameter on the connecting hole portion 1-4 in a finish work process, expanding the branch hole 1-2' by a method of pressing a diameter expansion device 6-2 having substantially the same diameter as the inner diameter of the branch hole 1-2 having a predetermined hole diameter such as a spherical body or a plug into the branch hole 1-2' having the small diameter by means of a pressing apparatus 9, and generating a compression residual stress at a portion near the open end portion of the communication passage 1-1 of the block rail 1 in the branch hole 1-2, as means for generating a compression residual stress at a portion near the open end portion of the communication passage 1-1 of the block rail 1 in the branch hole 1-2.

As mentioned above, in accordance with the invention, a compression residual stress is generated at a portion near the open end portion of the communication passage 1-1 of the block rail 1 in the branch hole 1-2 by the press method by means of the punch (an external pressing method), the internal pressing method due to the water pressure or the oil pressure, the pipe expansion method and the diameter expansion method by means of the spherical body and the plug, so that the repeated high internal pressure within the block rail 1 and the tensile stress generated at the inner peripheral edge portion P of the lower end in the branch hole 1-2 due to the axial force applied to the pressure receiving seat surface 1-3 together with the pressing of the connecting head portion 2-2 in the branch pipe 2 can be widely reduced by a canceling operation of the compression residual stress. Further, in the case that the press method by the punch is employed as the means for generating the compression residual stress at a portion near the open end portion of the communication passage 1-1 in the block rail 1, since the inner peripheral surface of the communication passage 1-1 in the block rail 1 at a portion near the branch hole 1-2 slightly projects by the press so as to form the flat portion 1-8, the tensile stress generated in the inner peripheral edge portion P of the lower end in the branch hole 1-2 can be further reduced by the compressing operation and the compression residual stress.

In this case, the common rail in each of the embodiments mentioned above is structured such that a center of the communication passage of the block rail and a center of the branch hole in the connecting hole portion are coincided with each other, however, it is a matter of course that the invention can be applied to the common rail in which a center of the branch hole of the connecting hole portion is shifted to a diametrical direction of the communication passage of the block rail as shown in Japanese Patent Application No. 9-13141.

Figure 9A:
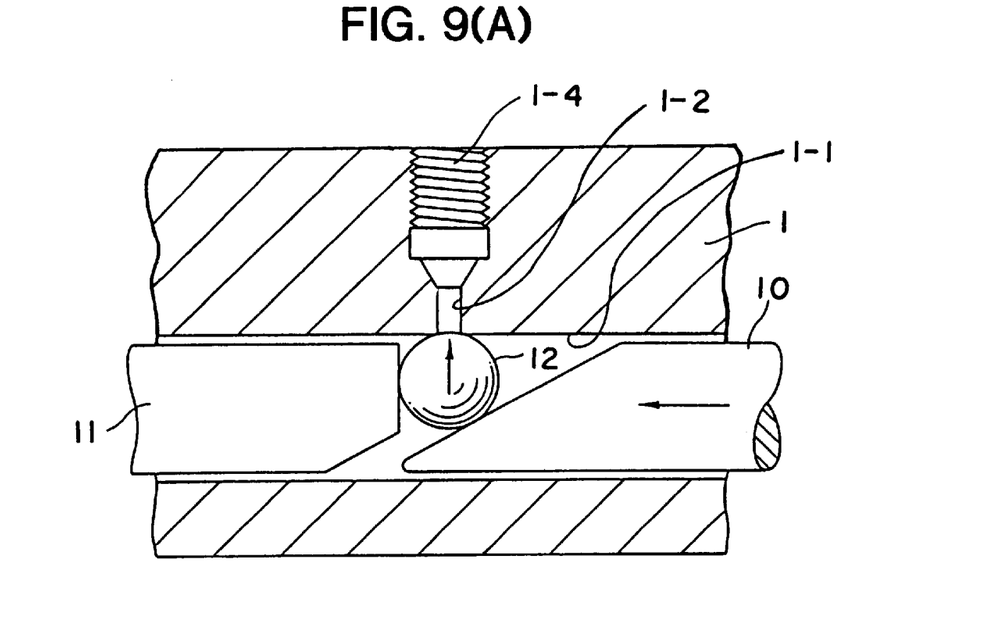
FIG. 9A is a vertical cross sectional view of a connecting hole portion which shows a method of pressing the open end portion of the communication passage of the block rail in the branch hole by using a spherical body and FIG. 9B is a vertical cross sectional view of the connecting hole portion which shows a method of pressing the open end portion of the communication passage of the block rail in the branch hole by using a piece-like body having a tapered front end.

Next, a method shown in FIG. 9A exemplifies a method of generating a compression residual stress in the open end portion of the communication passage of the block rail in the branch hole 1-2 by using a rigid ball 12. In this method, the rigid ball 12 and a rod-like rigid ball receiver 11 are inserted into the inner portion of the block rail 1, the rigid ball receiver 11 is disposed in such a manner that a spherical surface of the rigid ball 12 is brought into contact with the open end portion of the communication passage of the block rail in the branch hole 1-2, and a punch 10 having a front end portion formed in a wedge shape is inserted from the end portion of the communication passage 1-1 in the other block rail 1, thereby mounting the rigid ball 12 on the inclined slide surface in the front end portion. In this state, when the punch 10 is pressed, a force in a direction of the branch hole is applied to the rigid ball 12 due to a wedge effect by the front end portion of the punch 10, so that the rigid ball 12 is pressed to the open end portion of the communication passage of the block rail in the branch hole 1-2.

Then, a load is applied by pressing the punch 10 until reaching to a necessary pressure, thereby strongly pressing the rigid ball 12 to the open end portion of the communication passage of the block rail, and thereafter, the rigid ball 12, the rigid ball receiver 11 and the punch 10 are removed from the block rail 1. In the case of this method, since a pressing force is applied to the open end portion of the communication passage of the block rail in the branch hole 1-2 by the rigid ball 12 pressed by the punch 10, a compression residual stress can be effectively generated and remained at a portion near the open end portion of the communication passage of the block rail in the branch hole 1-2.

Figure 9B:
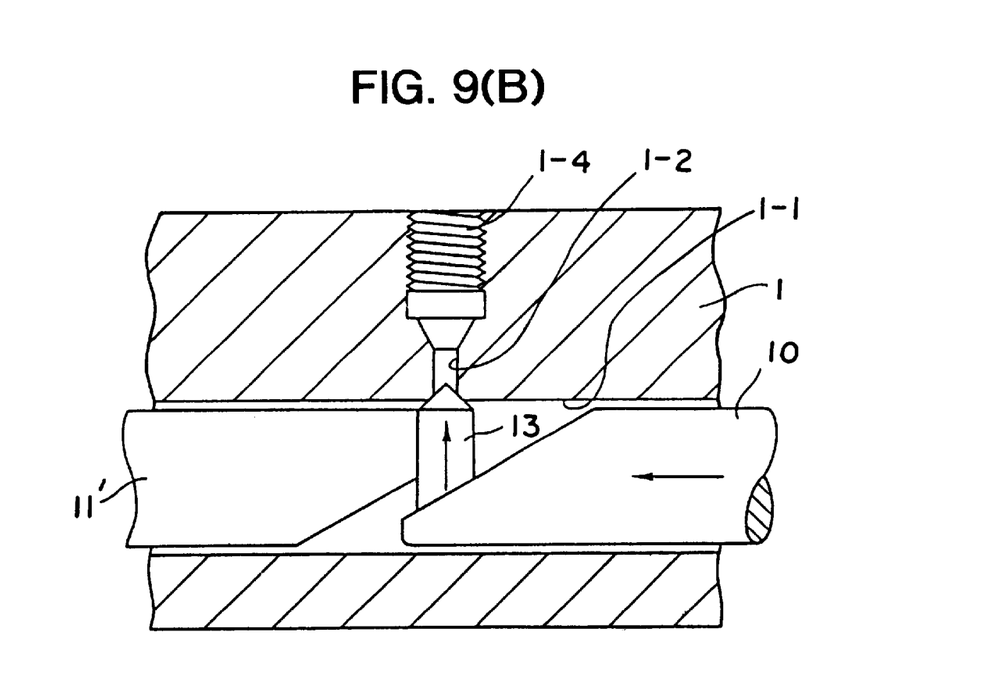
Figure 10A:
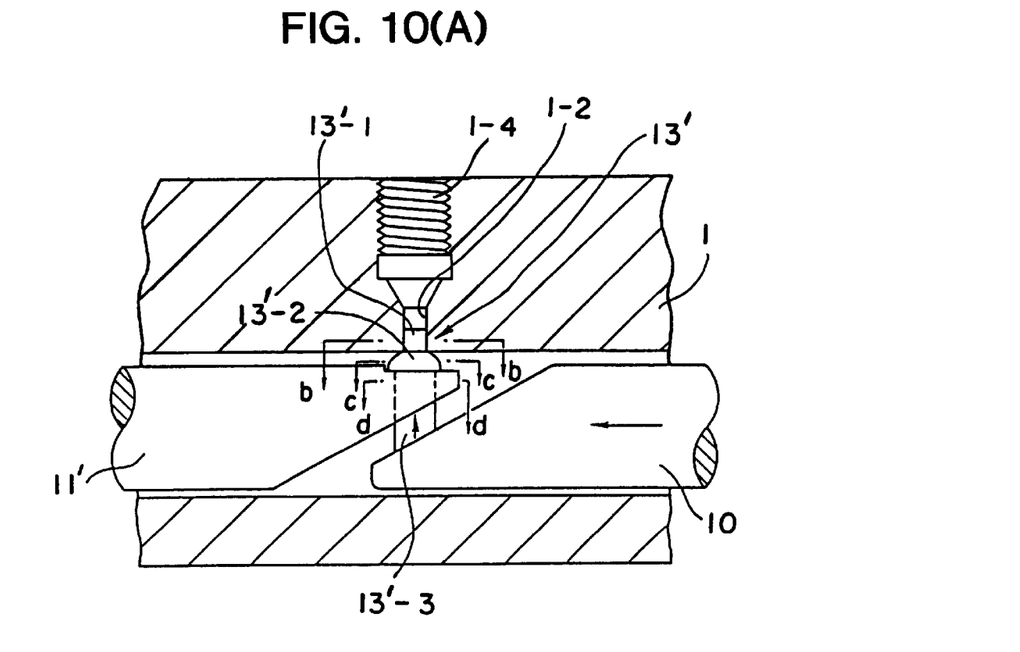
FIG. 10A is a vertical cross sectional view of the sixth embodiment.
Figure 10B:
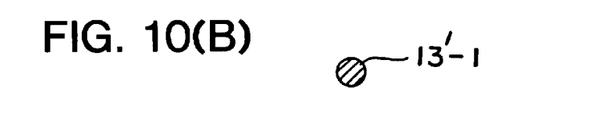
FIG. 10B is a cross sectional view on a line b-b in FIG. 10A.
Figure 10C:
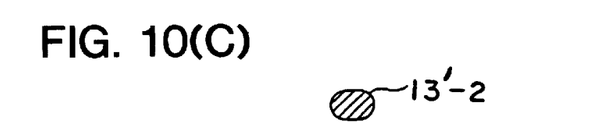
FIG. 10C is a cross sectional view on a line c-c in FIG. 10A
Figure 10D:
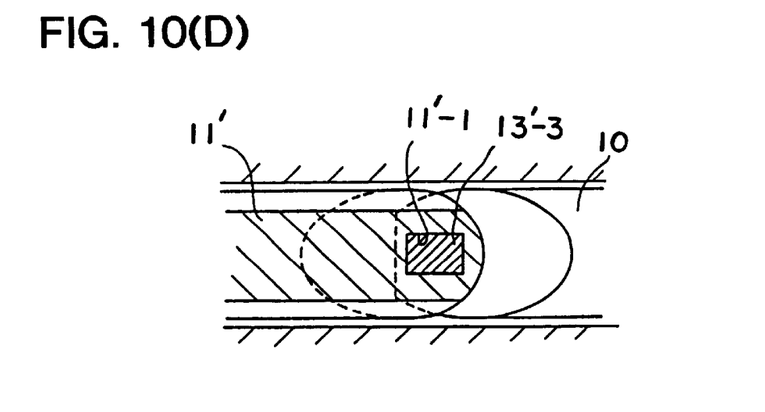
FIG. 10D is a cross sectional view on a line d-d in FIG. 10A.

A method shown in FIG. 9B exemplifies a method of generating a compression residual stress in the open end portion of the communication passage of the block rail in the branch hole 1-2 by using a piece-like body 13 having a front end formed in a conical shape in place of the rigid ball 12. In this method, in accordance with the same operation order as that of FIG. 9A mentioned above, the piece-like body 13 and a rod-like piece-like body receiver 11' are inserted into the block rail 1, the piece-like body receiver 11' is disposed in such a manner that a conical surface of the piece-like body 13 is brought into contact with the open end portion of the communication passage of the block rail in the branch hole 1-2, and the punch 10 having a front end portion formed in a wedge shape is inserted from the end portion of the communication passage 1-1 in the other block rail, thereby mounting the piece-like body 13 on the inclined slide surface of the front end portion. In this state, when the punch 10 is pressed, a force in a direction of the branch hole is applied to the piece-like body 13 due to a wedge effect by the front end portion of the punch 10 in the same manner as that of the rigid ball case mentioned above, so that the piece-like body 13 is pressed to the open end portion of the communication passage of the block rail in the branch hole 1-2. Then, a load is applied by pressing the punch 10 until reaching to a necessary pressure, thereby strongly pressing the piece-like body 13 to the open end portion of the communication passage of the block rail, and thereafter, the piece-like body 13, the piece-like body receiver 11' and the punch 10 are removed from the block rail 1. Accordingly, in accordance with this method, since a pressing force is applied to the open end portion of the communication passage of the block rail in the branch hole 1-2 by the piece-like body 13 pressed by the punch 10, a compression residual stress can be effectively generated and remained at a portion near the open end portion of the communication passage of the block rail in the branch hole 1-2, in the same manner as that of the rigid ball.

It is preferable to use a piece-like body 13' having a structure shown in FIG. 10 in place of the piece-like body 13 shown in FIG. 9B. The piece-like body 13' shown in FIG. 10 is constituted by an integral combination of a front end portion 13'-1 having a circular cross section, a pressing portion 13'-2 having an oblong cross section and a base portion 13'-3 having a rectangular cross section. The front end portion 13'-1 having a circular cross section has a circular cross sectional shape substantially aligned with an inner diameter of the branch hole 1-2 for being guided to the branch hole 1-2 so as to accurately position the piece-like body 13'. Further, the pressing portion 13'-2 having an oblong cross section has an oblong cross sectional shape making a longitudinal direction of the communication passage 1-1 a long line for concentrically pressing both sides of the main pipe rail 1 of the lower end inner peripheral edge portion in the branch hole 1-2 in which a great tensile stress is easily generated among the open end portion of the communication passage of the block rail. Still further, the base portion 13'-3 having a rectangular cross section has a rectangular cross sectional shape for securing a directivity of the piece-like body 13' by fitting to a rectangular hole 11'-1 provided in the front end portion of the piece-like body receiver 11'.

An operation order for effectively generating and remaining a compression residual stress at a portion near the open end portion of the communication passage of the block rail in accordance with the method shown in FIG. 10 is the same as the manner as that shown in FIG. 9.

Figure 11:
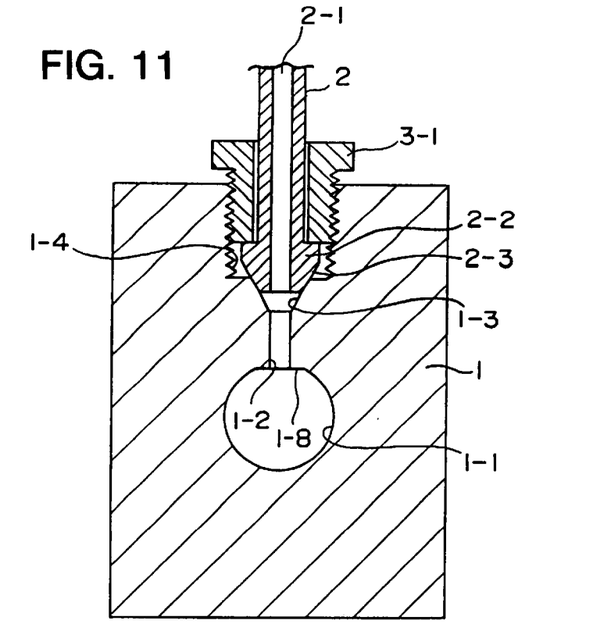
FIG. 11 is a vertical cross sectional view which shows an embodiment of a branch pipe connecting structure of the common rail manufactured by the method of manufacturing the common rail having the connecting hole portion integrally formed with the block rail.

On the contrary, the branch pipe 2 is constituted by a branching pipe or a branch metal fitting, has the flow passage 2-1 communicating with the communication passage 1-1 of the block rail 1 therewithin, and is provided with a pressing seat surface 2-3 constituted by the connection head portion 2-2 expanded by a buckling formation and having a conical front end in the end portion thereof, and the connection structure thereof is made such that in the case of the branch pipe connecting structure shown in FIG. 11, a fastening and a connection is performed together with a pressing under the neck of the connection head portion 2-2 by bringing the pressing seat surface 2-3 constituted by the connection head portion 2-2 close to the branch pipe 2 into contact with the pressure receiving surface 1-3 close to the block rail 1 and engaging therewith, and by meshing the fastening external screw nut 3-1 previously assembled in the branch pipe with the connection hole portion 1-4.

As mentioned above, since the common rail in accordance with the invention can effectively cancel the generation of the tensile stress in the lower end inner peripheral edge portion of the branch hole by the compression residual stress so as to effectively restrict the tensile stress, and can improve the internal pressure fatigue strength in the branch pipe connecting portion, the common rail has excellent effect that a secure and stable function can be obtained by having an excellent durability and preventing a fluid leakage due to a generation of the crack generation. Further, in accordance with the method of manufacturing the common rail of the invention, since a pressure application process is only added to the normal manufacturing process and no complex equipment is required, there is no problem that an equipment cost is increased by an increase of the process and a productivity is reduced, so that a great effect that a common rail having a high quality can be provided by a low cost can be obtained.

What is claimed is:

1. A common rail comprising:

a block rail having a peripheral wall with an outer surface and a communication passage extending through the block rail, at least one branch hole extending through the peripheral wall of the block rail from the communication passage to the outer surface, the branch hole being formed to define a pressure receiving seat between said communication passage and said outer surface, said pressure receiving seat opening and facing outwardly on said block rail;

at least one branch pipe having an end and a connection head extending from the end, the end of the branch pipe defining a pressing surface configured for engaging the pressure receiving seat of the branch hole in the block rail;

a fastening nut engaged around the branch pipe adjacent the connecting head, the fastening nut being fastened to the common rail in the branch hole for urging the end of the branch pipe into the pressure receiving seat of the branch hole; and wherein the peripheral wall of the block rail includes a compression residual stress at locations on the peripheral wall adjacent the communication passage and surrounding the branch hole.

2. The common rail of claim 1, wherein the branch hole is aligned substantially perpendicular to the communication passage.

3. The common rail of claim 1, wherein the communication passage is substantially cylindrical at locations spaced from said branch hole, portions of said communication passage surrounding said branch hole being substantially planar.

4. The common rail of claim 1, wherein portions of said branch hole between said pressure receiving seat and said outer surface are formed with an array of internal threads, said fastening nut being formed with an array of external threads for threaded fastening of said fastening nut to said block rail at portions of said branch hole between said pressure receiving seat and said outer surface.

5. The common rail of claim 1, wherein portions of said peripheral wall having said compression residual stress define a flattened surface facing into said communication passage.

* * * * *